(No Model.)
F. HURTER.
APPARATUS FOR MANUFACTURING CHLORATE OF POTASH BY ELECTROLYSIS.
No. 587,437. Patented Aug. 3, 1897.
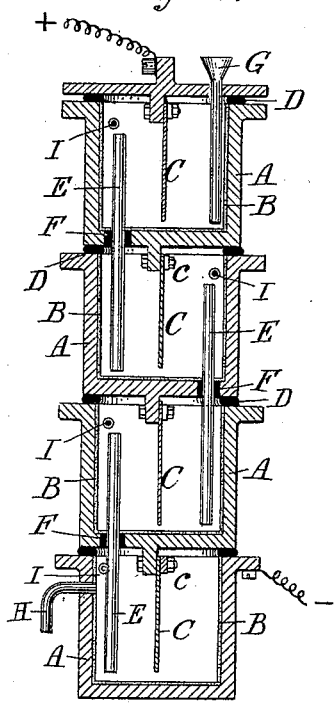
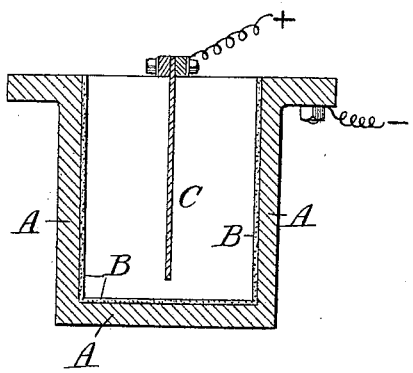

UNITED STATES PATENT OFFICE.

FERDINAND HURTER, OF LIVERPOOL, ENGLAND, ASSIGNOR TO THE UNITED ALKALI COMPANY, LIMITED, OF SAME PLACE.

APPARATUS FOR MANUFACTURING CHLORATE OF POTASH BY ELECTROLYSIS.

SPECIFICATION forming part of Letters Patent No. 587,437, dated August 3, 1897.

Application filed May 8, 1897. Serial No. 635,686. (No model.) Patented in England August 12, 1893, No. 15,396.

*To all whom it may concern:*

Be it known that I, FERDINAND HURTER, chemist, a citizen of the Swiss Republic, residing at Holly Lodge, Cressington Park, Liverpool, in the county of Lancaster, England, have invented certain Improvements in or Connected with Apparatus for the Manufacture of Chlorate of Potash by Electrolysis, (for which I have obtained a patent in Great Britain, No. 15,396, dated August 12, 1893,) of which the following is a specification.

My invention has for its object to effect the better utilization of the electric current in the manufacture of chlorate of potash by electrolysis, so as to obtain a better yield and also to avoid frequent repairs to the cells or containing vessels.

I will describe my invention with reference to the accompanying drawings, wherein—

Figure 1 is a vertical sectional view of one of my improved cells; and Fig. 2 is a vertical sectional view of a series of cells properly connected.

According to my invention I provide metal cells or containing vessels, as shown at A, for example, in Fig. 1, preferably made of cast-iron. These vessels I paint or coat inside with a mixture of Portland cement, salt, sand, and water for the purpose of protecting them from the action of the electrolyte or gases evolved thereby. I may use equal volumes of good and dry cement and of dry common salt; but I prefer to use less salt—say one volume of salt to two volumes of Portland cement. I may add a small quantity of sand to this, or I may use good Portland cement and salt only. When this mixture has set hard, I repeat the operation of coating until the layer of cement has become sufficiently thick—say one quarter to half an inch thick. I prefer a thin layer. The lining thus formed is shown at B. When the cement has set, I fill the vessel with water to extract all the salt, and thus I obtain a very firm but porous lining which is not acted upon by the solution to be afterward used.

In order to give to the cement durability, it is advisable to use cells of round or oval transverse section, since from plane surfaces the cement has a tendency to peel off, owing to the evolution of hydrogen gas on the iron surface which must escape through the porous cement. I place a number of these cells in series, using the walls of the cells as cathodes and connecting each of them to the anode of the next cell of the series. As anodes I use sheets of platinum, as shown at C. Into these cells is introduced a solution of potassium chlorid rendered alkaline with caustic potash and kept at a suitable temperature, such as a temperature of from 60° to 80° centigrade. This may be effected by steam-coils in the cells or in any other convenient way; but the heating effect of the current itself is normally sufficient. I conduct the electric current from the positive terminal of any suitable source of electricity into the solution by means of the sheets of platinum, the current thence passing through the solution and through the porous lining of cement into the walls of the metallic cell, (which is connected to the platinum sheets of the next cell either directly or otherwise, for example, by metallic wires or cables,) and so on until the current leaves the series through the walls of the last cell which are connected to the negative terminal of the source of electricity.

I prefer to place the several cells forming a series one above the other, as shown in Fig. 2, taking care to place insulating material—such, for example, as hard rubber—between any two of the cells and between the top cell and its cover, as shown at D, so that they are not in metallic contact. I attach the sheets of platinum C, which serve as anodes in the lower cells, directly to the bottom of the metal of the cell immediately above it, as shown at c, the top anode being similarly attached to the cover, and I provide pipes or passages E, so that the solution can flow continuously from compartment to compartment. Care must be taken that these pipes or passages do not form false connections, which are best avoided by using pipes of non-conducting material, such as glass or ebonite or the like, and by insulating the pipes by passing them through insulating-stoppers, as at F. The upper ends of these pipes should be at such a level below the lowermost part of the iron of the cell or cover above that liquid will not touch the iron of the cell or cover above. G is the inlet for the solution, and H is the outlet or overflow pipe, and I are the gas-outlets.

Having now particularly described and ascertained the nature of my said invention and in what manner the same is to be performed, I declare that what I claim is—

1. In apparatus for use in the manufacture of chlorate of potash from potassium chlorid by electrolysis, a cathode consisting of a metallic vessel having a porous protective lining, substantially as described.

2. An apparatus for use in the manufacture of chlorate of potash from potassium chlorid by electrolysis, consisting of a metallic vessel having a porous protective lining composed essentially of cement, said metallic vessel forming the cathode, and a sheet or rod of platinum projecting into the electrolyte contained in the vessel and forming the anode, substantially as described.

3. An apparatus for use in the manufacture of chlorate of potash from potassium chlorid by electrolysis, consisting of a series of superposed metallic vessels insulated from each other and each having a porous protecting lining, the said metallic vessels constituting cathodes, and platinum anodes suspended from the upper vessels and projecting respectively into the vessels beneath, substantially as described.

In testimony whereof I have signed my name to this specification in the presence of two subscribing witnesses.

FERDINAND HURTER.

Witnesses:
ALFRED PATCHETT,
S. McCREADY.